United States Patent [19]
Cosentino

[11] Patent Number: 5,127,184
[45] Date of Patent: Jul. 7, 1992

[54] FLOWER ARRANGING APPARATUS

[76] Inventor: Ronald R. Cosentino, P.O. Box 393, Seneca Falls, N.Y. 13148

[21] Appl. No.: 533,280

[22] Filed: Jun. 4, 1990

[51] Int. Cl.$^5$ ............................................. A01G 5/00
[52] U.S. Cl. .................................. 47/41.01; 47/41.12
[58] Field of Search ............... 47/41.01, 41.11, 41.12

[56] References Cited

U.S. PATENT DOCUMENTS

| 2,781,651 | 2/1957 | Cutler | 47/41.01 |
| 4,964,237 | 10/1990 | Specht | 47/41.01 |

FOREIGN PATENT DOCUMENTS

| 478221 | 6/1929 | Fed. Rep. of Germany | 47/41.01 |
| 3342370 | 5/1985 | Fed. Rep. of Germany | 47/41.11 |
| 4395 | 1/1905 | France | 47/41.11 |
| 2479649 | 4/1980 | France | 47/41.11 |
| 12806 | of 1894 | United Kingdom | 47/41.13 |
| 851 | of 1915 | United Kingdom | 47/41.11 |

*Primary Examiner*—Henry E. Raduazo
*Attorney, Agent, or Firm*—Katherine McGuire

[57] ABSTRACT

A guide for the placement of flora into flora receiving means such as a conventional flower pot with moistened florist foam deposited therein to assist the novice in creating a substantially symmetrical arrangement of professional quality. The guide comprises a base having a central opening for positioning around the flora receiving means and includes a plurality of resilient, elongated wires extending therefrom to form a symmetrical area such as a dome defined by the wires and base. In the preferred embodiment, a square frame supported by adjustable legs may be positioned to surround the flora receiving means and includes linear extensions having notches cut or otherwise formed therein for releasable attachment of the base thereto such that the symmetrical area of the base is coaxial with the flora receiving means. The wires of the base define a plurality of spaced openings through which cut flora is passed and inserted stem first into the florist foam such that the free ends of the flora do not extend substantially beyond the area defined by the wires. Once the area is substantially filled with flora, the guide is removed from the frame. The user may then remove the flower pot and resulting symmetrical arrangement from within the confines of the frame or may instead use a second guide concentrically larger than the first to create a second layer of symmetrically placed flora to the arrangement.

5 Claims, 3 Drawing Sheets

FLOWER ARRANGING APPARATUS

BACKGROUND OF THE INVENTION

This application relates to the art of making flower arrangements and, more particularly, to novel and unique apparatus which may be used by the novice as a guide to create professional quality flower arrangements in a surprisingly short period of time.

The making of attractive flower arrangements requires the skill of assembling different types and sizes of plants and flowers typically into a container or yet other means which secure the flora together into an effective arrangement. In a typical arrangement, background foliage is desirable such as ferns or other such greenery. To create an effective arrangement, the background foliage in addition to other flowers of choice must be placed in a certain disposition and in certain amounts into the flora securing means. It is usually most desirable to create a substantially symmetrical arrangement. Unfortunately, it takes a keen eye and much experience before most persons are able to create such professional quality flower arrangements.

It is therefore a main object of the present invention to provide apparatus which assists the most inexperienced flower arranger in creating floral arrangements of varied outline and size which is of professional quality, i.e. substantially symmetrical in configuration.

It is a further object to provide flower arranging apparatus which will assist and train a person in creating a professional quality flower arrangement in a significantly short period of time.

It is another object to provide flower arranging apparatus which includes coded parts which contrast with the flora used therewith and which easily and quickly indicate to the user the different types of flora to be used with each part of the apparatus.

Other object will in part be obvious and in part appear hereinafter.

SUMMARY OF THE INVENTION

In accordance with the foregoing objects, the invention comprises apparatus designed to be used by the novice to act as a guide when assembling flora into a professional arrangement. At least one dome-shaped guide is provided for positioning over the flora securing means which may be a simple flower pot with moistened florist foam deposited therein for securely receiving the stemmed portion of the flora.

The dome-shaped guide comprises a ring-shaped base which may be snap-fit into notches cut or otherwise formed into linear extensions of a four legged, square frame which is positioned around the flower pot such that the height of the frame is substantially the same height of the pot. The legs of the frame are appropriately adjustable to conform to the height of the container. When the dome-shaped guide is thus snap fit to the frame, the ring-shaped base completely encircles the pot or container positioned within the confines of the frame.

A plurality of elongated, flexible yet resilient wires extend from spaced intervals along one side of the ring base and cross each other at a central point to form a substantially symmetrical dome having spaced openings between each of the wires such that flora may be passed through the openings in the wire dome and manually inserted stem first into the florist foam in the container located beneath and adjacent the central opening defined by the base of the guide. To create the arrangement, the stems of flora of one's choice are inserted into and secured in place by the florist foam as described above. The flora should have its stems previously cut to size such that when inserted into the foam, the free end tips of the flora do not extend beyond the domed area defined by the wires. The entire domed area defined by the wires should be completely filled with the flora as described above. After this task is finished, the person may remove the dome guide by simply unsnapping the ring base from the frame which surrounds the container. The result is a floral arrangement which is symmetrically shaped and pleasing to the eye.

To create a more glamorous arrangement, a second guide which is concentrically larger than the first may also be used in combination with the first guide when using a variety of flora. For example, in the preferred embodiment of the invention the first guide is attached to the frame as previously discussed and filled with background greenery such as ferns. The first guide is then removed and the second, larger guide is snap fit to appropriately placed notches in the frame such that it is concentrically aligned with the previously removed first guide. Another variety of flora such as baby's breath is passed through the openings between the wires of the second guide and inserted and secured into the florist foam as were the ferns such that the free ends do not extend beyond the second guide. The step is continued until the dome space defined by the wires of the second guide is filled with the baby's breath and other such flora, as desired. At this point, other flowers such as carnations and daisies may be added within the second guide dome to be mixed with the baby's breath or, if desired, the second guide may be instead removed from the frame and replaced with an even concentrically larger, third guide into which domed area the flowers of one's choice are filled. The third guide is then removed and the container and arrangement are lifted from within the confines of the frame. The result is flora which qualifies as a symmetrical, professional flower arrangement.

It is preferred that each dome-shaped guide be constructed with color coded wire to not only contrast with the flora deposited therein, but also to indicate to the user which type of flora are intended to be used with each guide. For example, the first guide can be colored hot pink which is coded for the background foliage layer and so forth. In this way a novice at flower arranging can make a professional quality flower arrangement in approximately fifteen to thirty minutes whereas without the flower arranging guide, it would require many hours of training to create such a professional arrangement.

DETAILED DESCRIPTION

Figure 1:
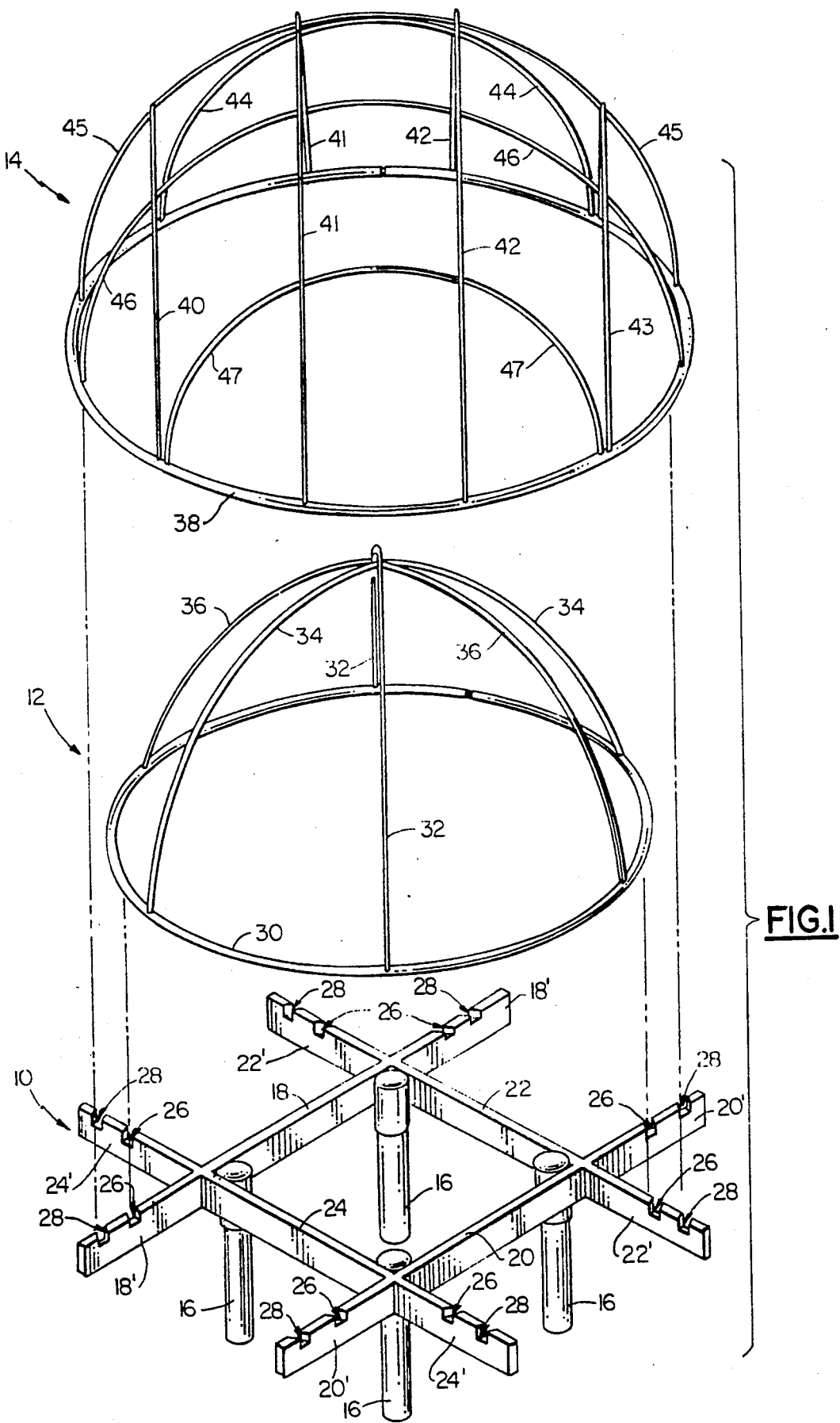
FIG. 1 is an exploded, perspective view of the preferred embodiment of the invention.

Referring now to the drawings, there is seen in FIG. 1 the preferred embodiment of the invention comprising a frame, a first dome-shaped guide, and a second dome-shaped guide represented generally by the reference numerals 10, 12 and 14, respectively.

The frame 10 comprises four legs 16 which support a pair of spaced, parallel members 18 and 20 and a pair of equally spaced, parallel members 22 and 24 which lie transversely to members 18 and 20 to define a square, open center. Linear extensions 18', 20', 22' and 24' of each member 18, 20, 22 and 24, respectively, have spaced notches 26 and 28 cut or otherwise formed therein to receive and secure guides 12 and 14 to frame 10 in the manner to be described.

First dome-shaped guide 12 includes base 30 of substantially circular configuration having a plurality of elongated, flexible yet resilient wires 32, 34 and 36 integrally extending at substantially equal, spaced intervals from base 30 to form a dome having spaced openings defined by wires 32, 34 and 36. It is noted that although the term "wire" is used herein to describe the members extending from base 30, they need not be made of conventional metallic wire but may be of any material such as plastic, the important feature being their elongated shape. Second dome-shaped guide 14 which is concentric and larger than guide 12, includes circular base 38 having a plurality of flexible yet resilient wires 40, 41, 42, 43, 44, 45, 46 and 47 integrally extending at substantially equal, spaced intervals from base 38 to form a dome having spaced openings defined by wires 40-47. Although two guides 12 and 14 are shown in the preferred embodiment shown in the drawings, it is to be understood that only one guide or any number of sequentially concentrically larger guides may be used when creating a flower arrangement with the invention herein described.

Figure 2:
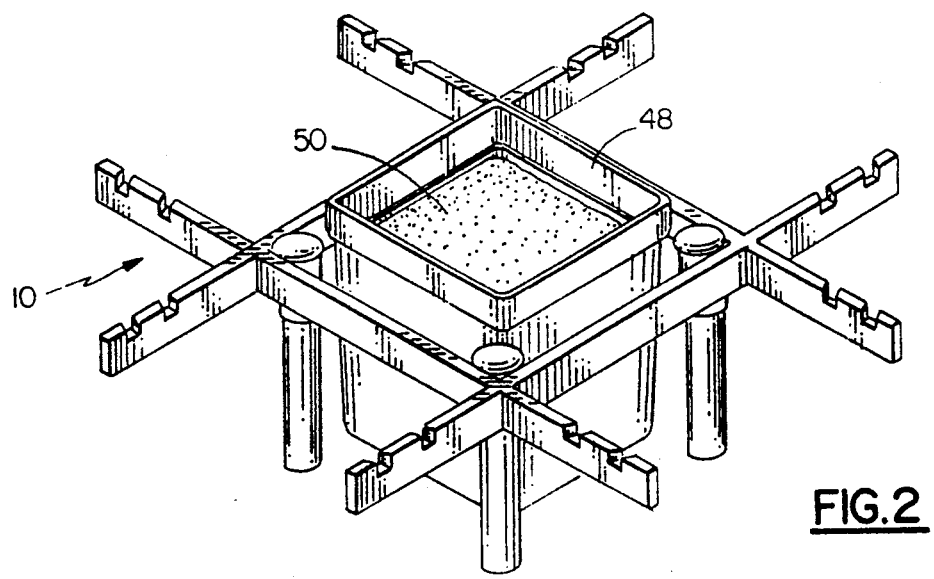
FIG. 2 is a perspective view of the frame portion of the invention placed about a conventional flower pot in the intended manner.

To create a flower arrangement with the guidance of the invention, frame 10 is placed over the flora securing means such as typical flower pot 48 as seen in FIG. 2. The height of frame 10 when placed upon a substantially horizontal surface should closely approximate the height of the pot 48 and in this respect, legs 16 are made adjustable by known means to achieve this requirement.

The container into which the flora is to be arranged should have the means to secure or stabilize the foliage in place as it is deposited into the pot 48. In the flower arranging art, a green foam termed an "oasis" is typically used for this purpose as it can hold a significant amount of water to feed the plants via the stems inserted and secured therein. Thus, pot 48 is seen to contain a predetermined amount of oasis 50 which has been moistened with water.

Figure 3:
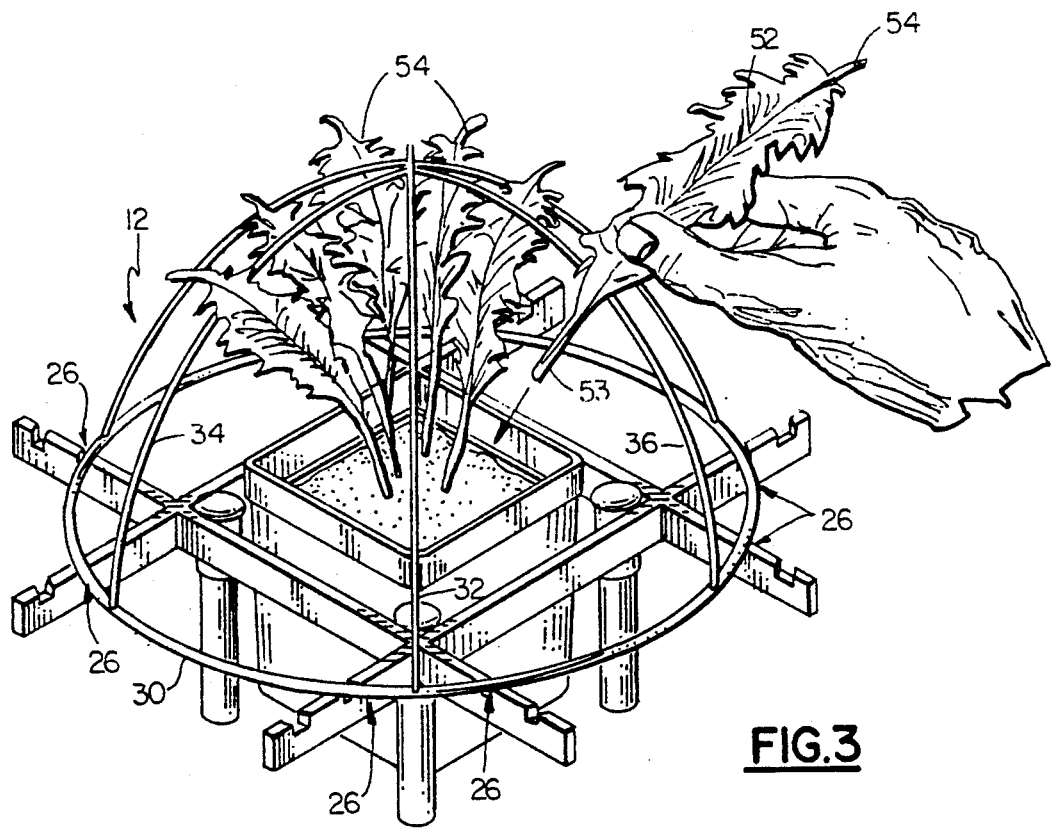
FIG. 3 is the view of FIG. 2 with a first guide attached to the frame and showing manual placement of a first layer of background foliage into the flower pot in the intended manner.
Figure 4:
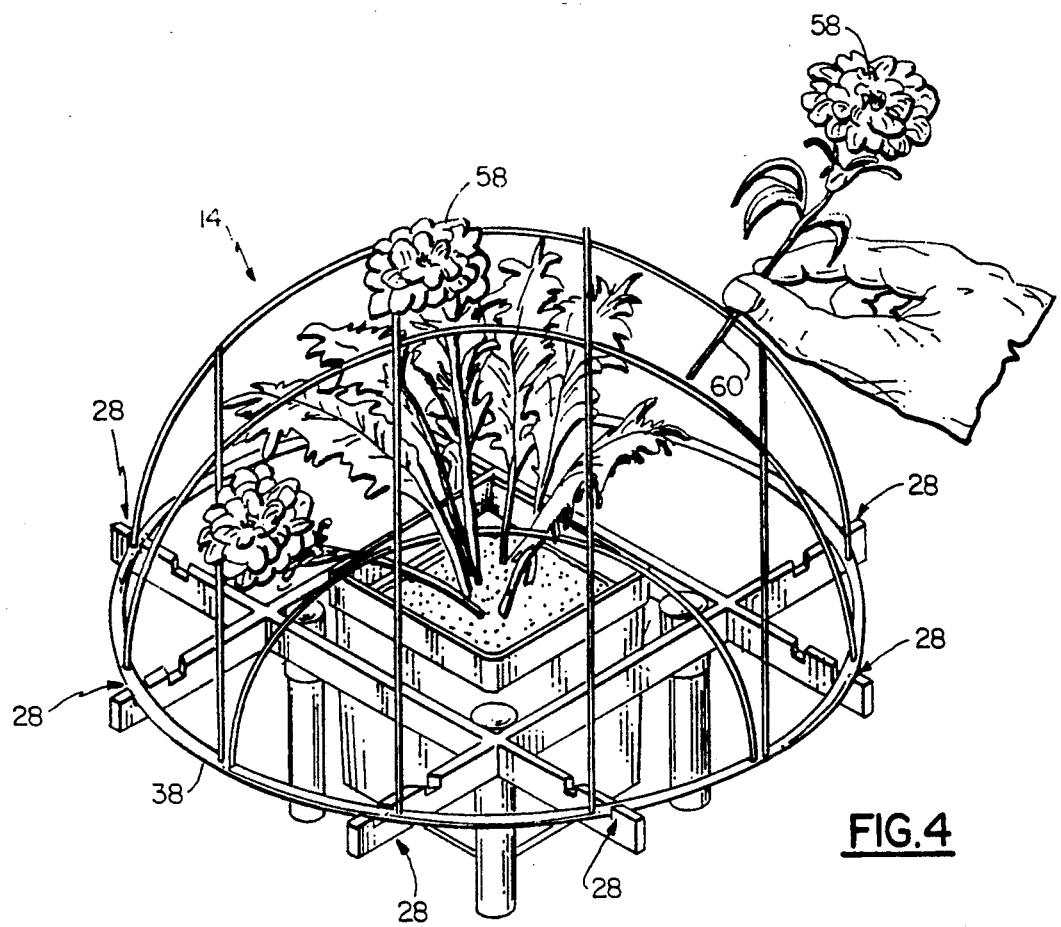
FIG. 4 is the view of FIG. 3 showing the first guide removed and the second, larger guide attached to the frame for manual insertion of the flower layer into the flower pot in the intended manner.

Once frame 10 has been properly positioned around pot 48 as seen in FIGS. 2, 3 and 4, the first guide 12 is secured to frame 10 by snap-fitting base 30 into notches 26 on extensions 18', 20', 22' and 24' as seen in FIG. 3. It is noted here that although frame 10 is the preferred securing means of the various guides such as 12 and 14 described herein, it is contemplated that the guides may be secured in the proper position over a floral securing medium, such as pot 48 and oasis 50, by yet other securing means. In any event, the proper securement of guide 12 over pot 48 should result in pot 48 and guide 12 having a common longitudinal axis extending through the point where wires 32, 34 and 36 cross each other (i.e., at the top of the "dome"), and down through the center of oasis 50, this axis being designated with the reference numeral 56 seen in FIG. 5.

With guide 12 thus in place about pot 48, a person selects background foliage, such as ferns 52 seen in FIGS. 3 and 4, and cuts the stems 53 such that when stems 53 are inserted into oasis 50, the tips 54 of ferns 52 do not extend substantially beyond the domed area defined by wires 32, 34 and 36. FIG. 3 illustrates proper placing of ferns 52 into oasis 50. Although only several ferns 52 are shown in FIGS. 3 and 4 for purposes of clarity, it is intended that the entire domed area defined by wires 32, 34 and 36 be filled with ferns 52. Upon completion of filling guide 12 with ferns 52, guide 12 is removed from frame 10 by unsnapping base 30 from notches 26 and lifting guide 12 off frame 10 such that it does not disturb ferns 52. The ferns 52 in oasis 50 should thus be positioned in a symmetrical, ordered formation.

Figure 5:
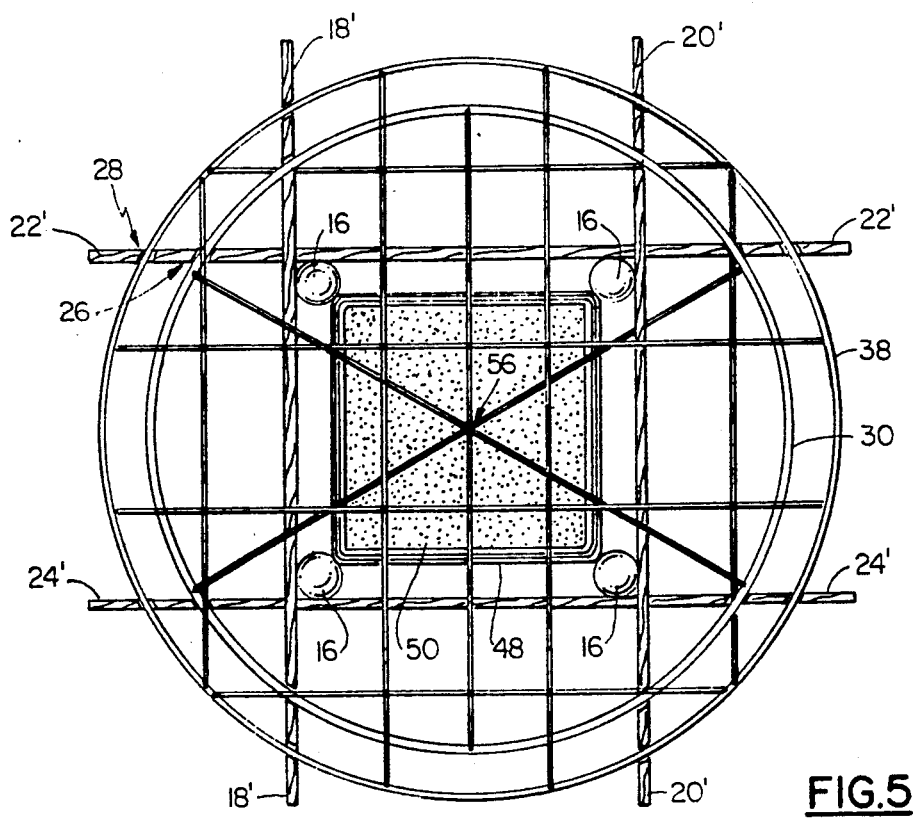
FIG. 5 is a top plan view illustrating the relative placement of the first and second guides when attached to the frame as seen in FIGS. 3 and 4.

Referring now to FIG. 4, concentrically larger, second guide 14 is used in succession to guide 12 when a more dramatic arrangement having a plurality of layers of flora is desired. Guide 14 is concentric with guide 12 and, when attached to frame 10 by snap-fitting base 38 into notches 28, shares the common longitudinal axis 56 with pot 48 as did guide 12 when secured in the proper position on frame 10. In this respect FIG. 5 illustrates a top view of the invention with both guides 12 and 14 attached to frame 10 in the intended manner (although guides 12 and 14 are actually used separately), it being clearly shown that guide 12, guide 14 and pot 48 are all positionally aligned about frame 10 to share a common longitudinal axis designated by reference numeral 56.

Having thusly secured guide 14 to frame 10 in the manner described above, a variety of flora of one's choice, such as flowers 58, are cut at the stems 60 such that when they are manually passed through the spaced openings defined by wires 40-47 and inserted into oasis 50, the flowers 58 do not extend substantially beyond wires 40-47. Although it is not necessary to completely fill the domed area of guide 14 as was desirable of the fern 52 layer, flowers 58 should be placed such that they are substantially evenly spaced about guide 14 to create an effective arrangement. Other flora may be mixed in with flowers 58 as desired, such as baby's breath and daisies, for example. It is noted that artificial (e.g., silk or dried) instead of real flora may be effectively used with the invention described herein.

After using as many flowers 58 as desired, guide 14 is removed from frame 10 in the same manner as was guide 12. If desired, another guide concentrically larger than guide 14 could be used to create a third layer of flora in the arrangement. A plurality of successively larger, concentric guides may be used at random to create different sized arrangements. The result, having removed all guides and lifting the pot 48 from within the confines of frame 10, is a styled, symmetrical arrangement of professional quality.

It is noted that although the description of the preferred embodiment herein is of guides formed to the domed configuration of guides 12 and 14, it is contemplated that for arrangements of different styles, such as those having a generalized triangular or oval outline instead of the herein described "dome" outline, the guides can be configured accordingly, the main requirement being that they assist the arranger in placing the flora in the correct position within the flora securement means.

What is claimed is:

1. Apparatus for creating a substantially symmetrical flower arrangement comprising:
   a) flora securing means adapted to accept and securely grip the stemmed portions of flora therein;
   b) a framework comprising:
      i) a first pair of spaced, parallel, linear members;
      ii) a second pair of spaced, parallel, linear members attached and extending transversely to said first pair of parallel members, said first and second pairs of members in combination defining a substantially square, open center, said first and second pairs of members intersecting each other at points between the free ends thereof thereby defining eight individual and integral, linear extensions of said first and second pair of members; and
      iii) means attached to and supporting said linear members above and in a plane parallel to a substantially horizontal surface, said framework being of a size permitting placement of said flora securing means within said open center;
   c) at least one flora placement guide having a base portion defining a symmetrical, central opening and further including a plurality of elongated, wire-like filaments attached to and extending from said base to form a symmetrical area defined by said filaments and said base, said filaments intersecting at an axis which extends through the center of said opening of said base in a direction perpendicular to the plane in which said base lies; a plurality of openings being defined between each of said intersecting filaments with said openings being of a predetermined size allowing passage of each end of said flora therethrough; and
   d) means releasably securing said base of said flora placement guide to said linear extensions of said frame with said central opening of said base in concentric alignment with said open center of said framework.

2. The invention according to claim 1 wherein said means releasably securing said base of said flora placement guide to said linear extensions of said frame comprise at least one notch formed in each of said extensions, each of said notches of a size permitting a friction fit with said base of said flora placement guide when said base is manually forced within said notches.

3. The invention according to claim 2 wherein said means attached to and supporting said linear members are a plurality of vertically adjustable legs extending perpendicular to the plane in which said base of said flora placement guide lies.

4. The invention according to claim 3 and further comprising:
   a) a second flora placement guide having a circular base portion concentrically larger than said at least one flora placement guide; and
   b) a second notch formed in each of said extensions to releasably receive said base of said second flora placement guide in concentric relationship to said first flora placement guide.

5. The invention according to claim 3 wherein said filaments are flexible and resilient.

* * * * *